J. R. SCOHY.
INTERNAL LOCK BAIT FOR DRAWING GLASS.
APPLICATION FILED MAY 6, 1920.
Reissued July 6, 1920. 14,911.
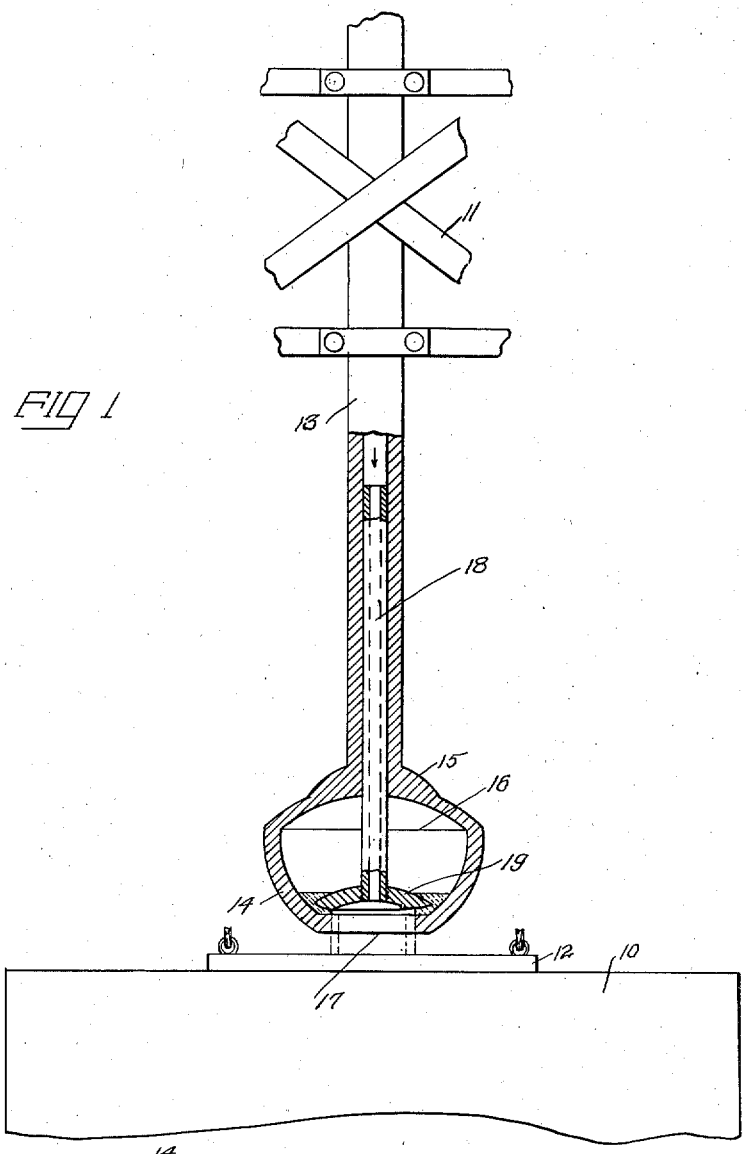
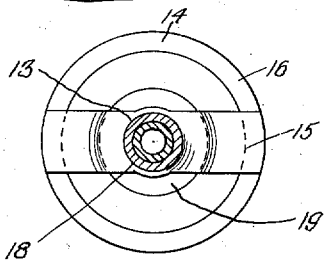
FIG 2
INVENTOR
John R. Scohy,
by
Owen, Otis & Crampton.

UNITED STATES PATENT OFFICE.

JOHN R. SCOHY, OF OKMULGEE, OKLAHOMA.

INTERNAL-LOCK BAIT FOR DRAWING GLASS.

14,911. Specification of Reissued Letters Patent. Reissued July 6, 1920.

Original No. 1,311,137, dated July 22, 1919, Serial No. 260,319, filed October 30, 1918. Application for reissue filed May 6, 1920. Serial No. 379,396.

*To all whom it may concern:*

Be it known that I, JOHN R. SCOHY, a citizen of the United States, and a resident of Okmulgee, county of Okmulgee, and State of Oklahoma, have made an Invention Appertaining to Internal-Lock Baits for Drawing Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an apparatus for drawing cylinders for molten glass and more particularly to an improved bait for carrying out the drawing operation, the object thereof being to provide an internal lock bait for simplifying the drawing operation and permitting the same to be carried on more quickly, especially for drawing hollow ware from a mass of molten glass.

The object of the invention is to provide an improved bait having an internal lock which will prevent the breaking of the glass due to contraction and also eliminate the possibility of a cylinder cracking or falling off of the bait.

A further object of the invention is to provide an improved bait which when dipped in the molten glass, will cause the latter to flow up between the bait and the interlock, and the glass being located between said said bait and the interlock, a positive retention is secured. Furthermore, as the parts are cooler than the glass, the glass will set at once and allow the pulling of the cylinder immediately, thus avoiding waiting for glass to set and eliminating practically all contraction owing to the fact that it is not necessary to allow the bait to set in the molten glass until the glass adheres to the same.

With the above and other objects in view, as will appear as the description proceeds, the invention comprises the novel features of construction, combinations of elements and arrangement of parts which will be more fully described in the following specification and then finally embodied in the clauses of the claim which is appended hereto and which forms an essential part of the same.

Reference is had to the accompanying drawings forming a part of this application, wherein similar reference characters will refer to corresponding parts throughout the several views, in which—

Figure 1 is a vertical sectional view showing my improved internal lock bait as applied to a glass drawing apparatus, and Fig. 2 is a horizontal sectional view of the bait looking downwardly.

Referring to the drawings in detail, I have shown my improved bait applied to a glass drawing apparatus including the dog house 10 of a furnace and a drawing apparatus 11, the dog house having provided therein, the usual top opening in which is vertically movable shield 12.

The bait includes a tubular stem or neck portion 13 at the lower end of which there is provided a semi-sperical bowl-like member 14 connected to the tubular portion by the cross strip or bridge 15 diametrically disposed across the top of the bowl to opposite sides of the edge 16 of the bowl. The lower side of the spherical bowl-like member is provided with an opening 17.

Movable in the tubular portion or neck 13 is a tube 18 at the lower end of which there is provided a concavo-convex flange portion 19 with the convexed face thereof disposed downwardly. The tube 18 has threaded engagement with the flange portion 19. The outer edge of the portion 19 is designed to engage the inner or concaved face of the bowl portion 14 of the bait.

The parts are formed of metal, preferably iron, and they will therefore tend to sink in the molten glass. The tube 18 telescopes in the tube 13 and is freely movable therein so that when the part 14 is moved down until the lower side of the bowl is dipped into the glass, the part 19 will follow more slowly the movement of the bowl 14 into the glass and will become unseated from the inner face of the bowl. This will uncover the opening 17 and allow the formation of a small bead or rim of glass above the outer edge of the part 19 before the part 19 practically closes the space between the part 19 and the inner surface of the bowl 14, leaving a connecting film of glass with the glass in the pot or tank. The rim or bead that is thus formed and the connecting film between the edge of the part 19 and the inner surface of the bowl 14 cools quickly and without adherence to the part 19 and the inner surface of the bowl 14. As the bait is withdrawn from the pot or tank, air under light pressure is directed through the telescoping tubes 13 and 18 to form the glass cylinder. Inasmuch as a very small amount of glass is allowed to enter the bowl by the automatic operation of the gravity actuated parts 18 and 19, the bead is formed within the bowl and above the periphery of the part 19 and inasmuch as it is quickly cooled before the bowl expands to its maximum degree, by reason of contact of the outside of the bowl with the molten glass in the pot or tank, the bead and the film between the edge of the part 19 and the edge of the opening formed in the bowl and connecting the bead with the mass of glass in the pot or tank, automatically causes the bead and the film of glass to separate themselves from the parts 14 and 19 and to such a degree that the cylinders, while being drawn and formed, may, if desired, be rotated with respect to the bait or the bait with respect to the cylinders. The bait is thus interlocked with the glass cylinder not by adherence of the surface of the glass on the metal of the parts, but by reason of the formation of the interconnected parts. This prevents fracture on the cylinder by the subsequent cooling of the bait during the drawing operation and prior to the cutting operation to separate the glass cylinder from the bait. Also by reason of the rapid formation of the hardened or semi-hardened bead and the separation of the glass within the bait from the metal parts of the bait, formation of an adhering film or frit on the parts of the bait is avoided. Thus the difficulties attendant to removal of the frit or adhering film is avoided. Also the liability to fracture of the cylinder which accompanies the formation of an adhering film or frit is also avoided.

I claim:—

1. In a bait for glass drawing apparatus, a tubular portion having at one end a substantially semi-spherical bowl provided with an opening on the lower side thereof, a movable tubular member telescoping in said tubular portion and having a flange, the edge of the flange overlapping the edge of the opening and operating to be lifted when the bowl is inserted in the glass and to be lowered to form and engage a rim of glass above the outer edge of the flange.

2. In a bait for glass drawing apparatus, a tubular portion having at one end a substantially semi-spherical bowl provided with an opening on the lower side thereof, a movable tubular member telescoping in said tubular portion and having an outwardly and downwardly extending flange, the edge of the flange overlapping the edge of the opening and operating to be lifted when the bowl is inserted in the glass and to be lowered to form and engage a rim of glass above the outer edge of the flange.

3. In a bait for glass drawing apparatus, a tubular portion having at one end a substantially semi-spherical bowl provided with an opening on the lower side thereof, a movable tubular member telescoping in said tubular portion and having an inverted saucer shaped flange, the edge of the flange overlapping the edge of the opening and operating to be lifted when the bowl is inserted in the glass and to be lowered by its weight operating against the buoyancy of the molten glass.

4. In a glass drawing apparatus, the combination with a furnace having a dog house with an opening and shield therein or the like, a bait raising and lowering apparatus, and a bait held therein, said bait comprising a tube adapted to receive a supply of compressed air or the like, said tube having a transverse portion at the lower end thereof and a bowl portion depending from said transverse portion and provided with an opening in the bottom portion thereof restricted as respects to the opening in the top portion thereof, and a plunger operable in said tube and adapted to move downwardly by gravity while the tube and bowl are forced downwardly, said plunger having a concavo-convex flange at the lower portion thereof forming an interlock adapted to clamp the glass between the same and the bowl portion when the latter is inserted in the molten glass, for drawing the latter as and for the purposes specified.

In testimony whereof I have hereunto signed my name to this specification.

JOHN R. SCOHY.